United States Patent [19]

Hanyu

[11] Patent Number: 5,995,658
[45] Date of Patent: Nov. 30, 1999

[54] IMAGE PROCESSING DEVICE AND IMAGE OUTPUT DEVICE CONVERTING BINARY IMAGE INTO MULTI-VALUED IMAGE

[75] Inventor: Yoshiaki Hanyu, Souka, Japan

[73] Assignee: Ricoh Company, Ltd., Tokyo, Japan

[21] Appl. No.: 08/854,748

[22] Filed: May 12, 1997

Related U.S. Application Data

[63] Continuation of application No. 08/427,869, Apr. 26, 1995, abandoned.

[30] Foreign Application Priority Data

| Apr. 28, 1994 | [JP] | Japan | 6-092160 |
| Apr. 19, 1995 | [JP] | Japan | 7-093428 |

[51] Int. Cl.⁶ .................................................. G06K 9/54
[52] U.S. Cl. ........................... 382/176; 382/269; 358/462
[58] Field of Search .................................... 382/174, 274, 382/252, 269, 260, 264, 266, 176, 254, 270; 358/486, 534, 538, 455, 462, 464

[56] References Cited

U.S. PATENT DOCUMENTS

| 4,110,795 | 8/1978 | Spencer | 358/260 |
| 4,194,221 | 3/1980 | Stoffel | 358/283 |
| 4,926,251 | 5/1990 | Sekizawa et al. | 358/75 |
| 4,953,013 | 8/1990 | Tsuji et al. | 358/75 |
| 5,271,095 | 12/1993 | Yamada | 395/128 |
| 5,282,059 | 1/1994 | Fukushima et al. | 358/456 |
| 5,459,587 | 10/1995 | Fukushima | 358/462 |
| 5,495,542 | 2/1996 | Shimomura et al. | 382/254 |
| 5,521,990 | 5/1996 | Ishizawa et al. | 382/270 |
| 5,701,363 | 12/1997 | Hanyuh | 382/174 |
| 5,784,488 | 7/1998 | Kuwata | 382/176 |

FOREIGN PATENT DOCUMENTS

| 0 236 594 | 9/1987 | European Pat. Off. | H04N 1/40 |
| 0 431 960 | 6/1991 | European Pat. Off. | H04N 1/40 |
| 2-112966 | 4/1990 | Japan | B41J 2/485 |

OTHER PUBLICATIONS

Patent Abstracts of Japan, vol. 17, No. 174, Apr. 5, 1993, JP–A–04 330864, Nov. 18, 1992, and US–A–5 459 587, Oct. 17, 1995.

Proceedings of Institute of Image Electronics, vol. 22, No. 2, 1993, Shigenobu Fukushima, "A Multi–Level Image Restoration Method from Bi–Level Images using Region Discrimination", pp. 152–161.

Proceedings of Image Electronics Conference, No. 19, 1991, Shigenobu Fukushima, "A Multi–Level Image Restoration MEthod from Bi–Level Images Using REgion Discrimination", pp. 73–76.

Proceedings of Institute of Engineers of Electronics and Communication, vol. J68–D, No. 6, 1985, Kenichi Takahashi, et al., "Edge Detection and Smoothing of Dithered Images", pp. 1354–1355.

Japan Hardcopy, Institute of Electronic Photography, NIP–24, 1990, Yoshinobu Mita, et al., "High Quality Multi–Level Image Restoration from Bi–Level Image with Neural Networks and Back Propatation", pp. 233–236.

Konica Ltd., Image Lab, Mar. 1990, Masahiko Matsunawa, "Technique of Image Restoration from Binary Image Into Half–Tone Image", pp. 19–24.

*Primary Examiner*—Andrew W. Johns
*Attorney, Agent, or Firm*—Oblon, Spivak, McClelland, Maier & Neustadt, P.C.

[57] ABSTRACT

An image processing device converting a binary image into multi-valued output image includes an image-area-separation processing unit detecting shadow areas in the binary image, wherein the shadow areas are graphic or photographic image areas having a number of lines greater than a predetermined number, an outline-correction processing unit correcting jagged edges in the binary image to generate a corrected image, an multi-value processing unit converting the binary image into a multi-valued image through a filtering process, and a selection unit selecting the multi-valued image for the shadow areas and the corrected image for areas other than the shadow areas so as to generate the multi-valued output image.

28 Claims, 8 Drawing Sheets

FIG. 4A
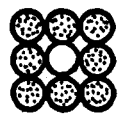
FIG. 4B
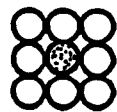
FIG. 4C
```
if (Sx<Tk)      then  Tk+=2;
if (Sx=Tk)      then  Tk+=1;
if (Sx>Tk)      then  Tk=Tk;
if (Sx>Tk+1)    then  Tk-=1;
if (Sx>Tk+2)    then  Tk-=2;
```

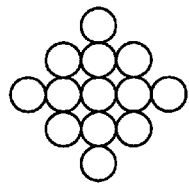
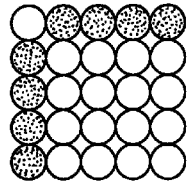
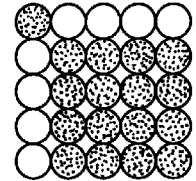
FIG. 6A  FIG. 6D  FIG. 6G  FIG. 6J
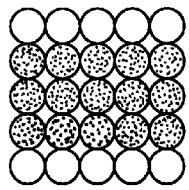
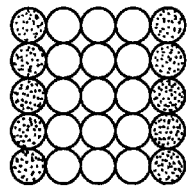
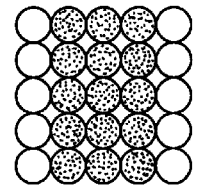
FIG. 6B  FIG. 6E  FIG. 6H  FIG. 6K
FIG. 6C  FIG. 6F  FIG. 6I  FIG. 6L
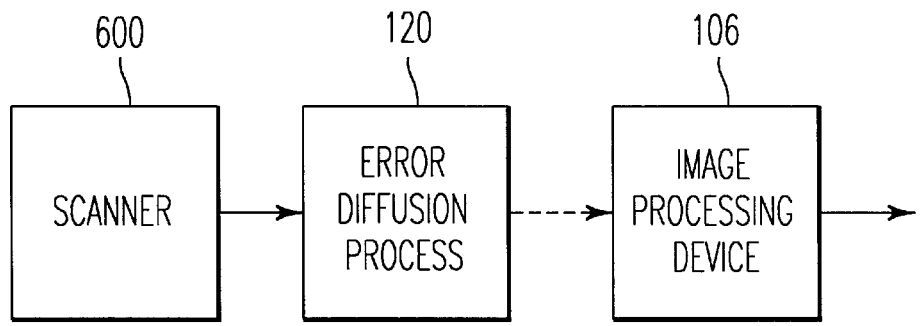
FIG. 7

```
 0  -1   0
-1   4  -1
 0  -1   0
```

```
1 1 1 1 1
1 1 1 1 1
1 1 1 1 1
1 1 1 1 1
1 1 1 1 1
```

IMAGE PROCESSING DEVICE AND IMAGE OUTPUT DEVICE CONVERTING BINARY IMAGE INTO MULTI-VALUED IMAGE

This application is a Continuation of application Ser. No. 08/427,869, filed on Apr. 26, 1995, now abandoned.

BACKGROUND OF THE INVENTION

1. Field of the Invention

The present invention generally relates to image processing devices, and more particularly relates to an image processing device which converts an input binary image into a multi-valued image.

2. Description of the Related Art

Related art methods which convert a binary image into a multi-valued image include the following techniques, some of which are devised in order to improve quality of an output image.

(a) Konica Ltd., Image Lab. 1933. 3, "TECHNIQUE OF IMAGE RESTORATION FROM BINARY IMAGE INTO HALF-TONE IMAGE" discloses a method in which images to be treated are restricted to photographic (natural) images.

(b) Cannon Ltd., NIP-24, "HIGH-DEFINITION MULTI-VALUED RESTORATION OF BINARY IMAGE USING NEURAL NETWORK" discloses a method which converts a binary image into a multi-valued image while distinguishing line-drawing areas from photographic(natural)-image areas by utilizing a learning capacity of a neural network.

(c) Proceedings of Institute of Engineers of Electronics and Communication, Vol.J68-D, No.6, 1985, "SMOOTHING PROCESSING AND EDGE DETECTION OF DITHER IMAGE" discloses a method which detects edges and changes an aperture size of a smoothing filter used for creating a multi-valued image.

(d) Proceedings of Image Electronics Conference, No.19, 1991, "METHOD OF RESTORING MULTI-VALUED IMAGE FROM BINARY IMAGE BY USING AREA IDENTIFICATION" and (e) Proceedings of Image Electronics, Vol.22, No.2, 1993, "METHOD OF RESTORING MULTI-VALUED IMAGE FROM BINARY IMAGE BY USING AREA IDENTIFICATION" disclose a method in which different types of image restoration techniques are applied based on results of image-area-separation processing of binary images, which processing identifies concentrated-pseudo-halftones by using dither matrixes.

(f) Japanese Laid-Open Patent Application No.2-112966, titled "IMAGE OUTPUT METHOD AND DEVICE" discloses a method which eliminates jagged edges of letter images or line-drawing images.

Taking an advantage of a limited application to photographic images, the method (a) can demonstrate its effect to some degree. When applied to other types of images, however, the method (a) brings about an image degradation in letter images and line drawings. The method (c) which detects edges and changes the aperture size of the smoothing filter in order to preserve an edge sharpness brings about image degradation as well.

The method (b) which uses the neural network requires huge hardware, which is not desirable, and does not offer a proven effect for an unlearned image.

The methods (d) and (e) require only a small amount of hardware, since they switch the types of image processing based on results of the image-area-separation processing on binary images. However, the use of the dither matrixes for identifying concentrated-pseudo-halftones leads to a poor resolution. Also, there is a problem that erroneous-separation points can be scattered within a particular area. Thus, when the method is used for a printer device, letters or line drawings can be degraded, or photographic image areas can be partly left unchanged to multi-values. These problems make it difficult to use the method for a practical purpose.

The method (f) eliminates jagged edges of letter images or line drawings and can create problems in processing photographs and graphic images.

Accordingly, there is a need in the field of image processing devices for an image processing device which can convert a binary image into a multi-valued image of an improved image quality while eliminating jagged edges of letter images and line drawings.

Also, there is a need in the field of image output devices for an image output device which can convert a binary image into a multi-valued image of an improved image quality while eliminating jagged edges of letter images and line drawings.

SUMMARY OF THE INVENTION

Accordingly, it is a general object of the present invention to provide an image processing device and an image output device which can satisfy the need described above.

It is another and more specific object of the present invention to provide an image processing device which can convert a binary image into a multi-valued image of an improved image quality while eliminating jagged edges of letter images and line drawings.

In order to achieve the above objects according to the present invention, an image processing device converting a binary image into multi-valued output image includes an image-area-separation processing unit detecting shadow areas in the binary image, wherein the shadow areas are graphic or photographic image areas having more than a predetermined number of lines, an outline-correction processing unit correcting jagged edges in the binary image to generate a corrected image, a multi-value processing unit converting the binary image into a multi-valued image through a filtering process, and a selection unit selecting the multi-valued image for the shadow areas and the corrected image for areas other than the shadow areas so as to generate the multi-valued output image.

According to the present invention, the photographic or graphic images comprised of a large number of lines are made into multi-valued images by using filters, so that the photographic or graphic images comprised of a large number of lines can be represented in gray levels. Also, only image areas other than the photographic or graphic image areas having the large number of lines are subject to an outline-correction processing for correcting the jagged edges. Thus, the outline-correction processing can be prevented from having a harmful effect on the photographic or graphic image areas having the large number of lines.

It is yet another object of the present invention to provide an image output device which can convert a binary image into a multi-valued image of an improved image quality while eliminating jagged edges of letter images and line drawings.

In order to achieve the above object, an image output device according to the present invention includes a memory storing a binary image, an image-area-separation processing unit detecting shadow areas in the binary image, wherein the shadow areas are graphic or photographic image areas having more than a predetermined number of lines, an outline-correction processing unit correcting jagged edges in the binary image to generate a corrected image, a multi-value processing unit converting the binary image into a multi-valued image through a filtering process, a selection unit selecting the multi-valued image for the shadow areas and the corrected image for areas other than the shadow areas so as to generate an output image, and an output device printing the output image.

Thus, the image output device of the present invention can print the output image which is the multi-valued image generated from the binary image. Also, the output image has an improved image quality, and the jagged edge-which existed in the binary image are eliminated in the output image.

Other objects and further features of the present invention will be apparent from the following detailed description when read in conjunction with the accompanying drawings.

BRIEF DESCRIPTION OF THE DRAWINGS

FIGS. 4A to 4C are illustrative drawings, where FIGS. 4A and 4B show matching patterns for detecting an isolated dot, and FIG. 4C shows conditions used for changing a threshold value for detecting the number of isolated dots;

FIGS. 6A to 6L are illustrative drawings showing matching patterns used for detecting chunks of black pixels or white pixels;

FIG. 7 is a block diagram of a configuration of a closed system in which an error-diffusion process is used for converting a multi-valued image into a binary image;

DESCRIPTION OF THE PREFERRED EMBODIMENTS

In the following, embodiments of the present invention will be described with reference to the accompanying drawings.

Figure 1:
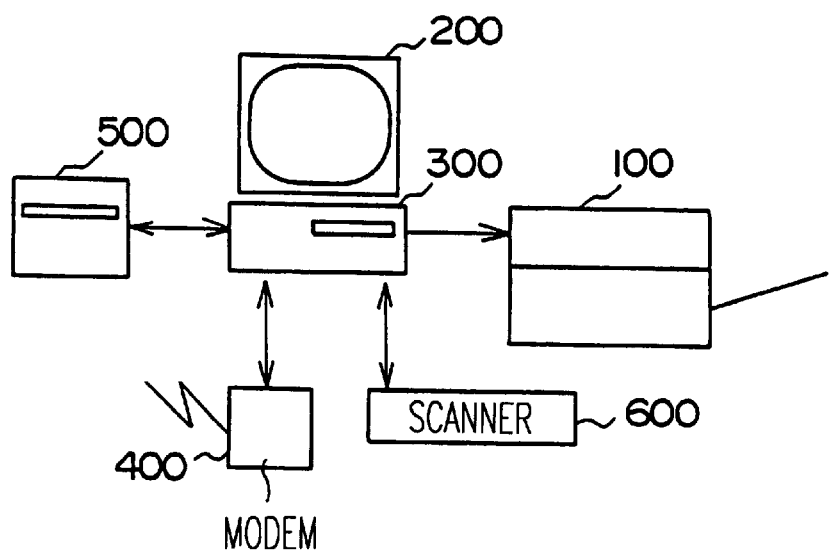
FIG. 1 is an illustrative drawing of a system using an image processing device according to the present invention.

FIG. 1 shows an illustrative drawing of a system using an image processing device according to the present invention. In FIG. 1, the system includes a printer 100 such as a laser printer having an image processing device 106 of the present invention inside, a display 200, a computer 300, an modem 400, a external data storage 500 such as a hard drive or an optical-disk drive, and a scanner 600. Here, the modem 400 is provided for modulating and demodulating image data when transmitting or receiving a facsimile.

An advantage of having the image processing device 106 in the system can be seen, for example, in a case in which the printer 100 prints a document created by an application program of the computer 300.

In general, a page memory provided in the printer 100 such as a laser printer is comprised of 1-bit pixels as a cost-reduction factor, providing only a binary-image capacity for an image to be printed. Although letters and line drawings can be represented by 1-bit pixels, photographs and graphic images are normally comprised of pixels of multi-values. Thus, photographs and graphic images should be converted into pseudo-halftone images having binary pixels to be stored in the page memory. This means that an image displayed on the display 200 may be different from that printed from the printer 100.

In this case, the binary image stored in the page memory can be converted into a multi-valued image by the image processing device 106 before the image is output by the printer 100. This permits the printing of photographs and graphic images having a high image quality without increasing the memory volume and, thus, without increasing the cost of the page memory.

Another example of the advantage of having the image processing device 106 can be seen in a case where the system of FIG. 1 is used as an image database system. In this case, a large number of images scanned by the scanner 600 are stored in the external-storage device 500, for example, an optical-disk drive, so that these images can be readily retrieved when necessary.

Assuming the use of an optical disk, the information storage capacity of a double-sided media of the external-storage device 500 can be as much as 1.2 Gbytes. However, this data-storage capacity can store only 75 pages of A4 (standard sheet size in Japan having a similar size to legal size) sheets when these sheets are scanned at 400 DPI (dot per inch) to be stored as 8-bit images (16 Mbytes). Thus, in order to save the data-storage capacity, these images are generally converted into binary images through a binary dither process.

Changing the images into a binary form can save not only the data-storage capacity but also data-retrieving time and display time. However, since the quality of these images is degraded in a binary form, the image processing device 106 should be used for improving the image quality. Namely, the image processing device 106 should convert these binary images into multi-valued images when these images are retrieved from the external-storage device 500 to be printed by the printer 100.

Still another example of the advantage of having the image processing device 106 can be seen in a case where image data is transmitted or received as a facsimile through the modem 400. Since facsimile images are sent via a telephone line, binary images of 200 DPI are used in order to reduce a transmission cost.

In the same manner as in the two previous examples, the quality of these images is degraded in a binary form, so that the image processing device 106 should be used for improving the image quality. Namely, the image processing device 106 should convert facsimile binary images into multi-valued images when these images are printed by the printer 100.

The use of binary images in a facsimile transmission will not be obsolete in the foreseeable future, except for a full-color facsimile transmission. Thus, the image processing device 106 of the present invention will be able to be applied to a facsimile transmission for the foreseeable future.

Figure 2:
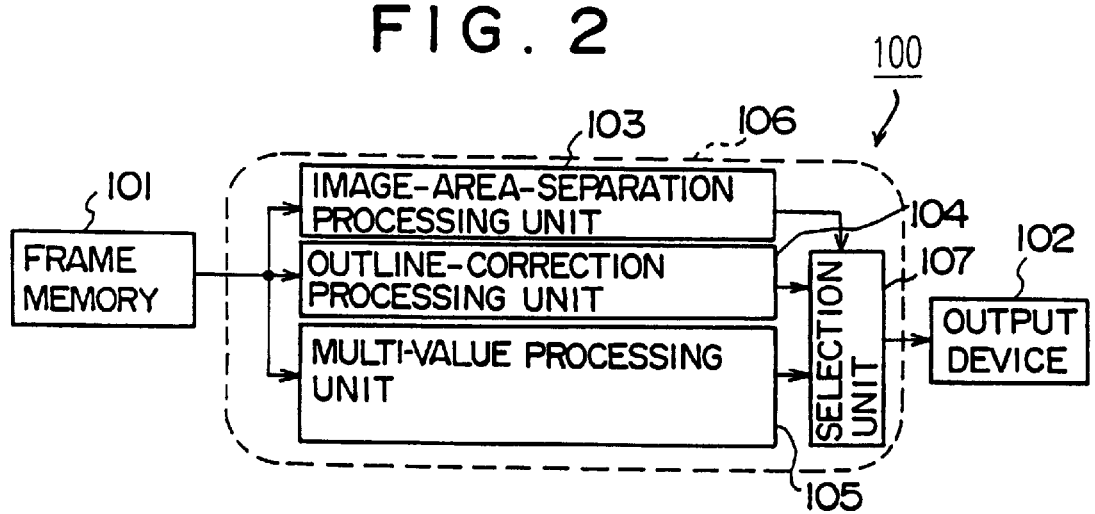
FIG. 2 is a block diagram of the printer of FIG. 1 having an image processing device according to the present invention.

FIG. 2 shows a block diagram of the printer 100 having the image processing device 106 of the present invention. In FIG. 2, the printer 100 includes a frame memory 101, the image processing device 106, and an output device 102 which is an engine for printing an electronic photographic image.

The image processing device 106 includes an image-area-separation processing unit 103 for binary images, an outline-correction processing unit 104, a multi-value processing unit 105 for pseudo-multi-value processing and multi-value gray-scale processing, and a selection unit 107. In FIG. 1 and FIG. 2, the image processing unit 106 is provided inside the printer 100. However, the present invention is not limited to this configuration, and can be used in various devices relating to image processing.

The selection unit 107 selects an output of the multi-value processing unit 105 for areas which are identified as a photographic image or a graphic image by the image-area-separation processing unit 103. Also, the selection unit 107 selects an output of the outline-correction processing unit 104 for other areas. These selected outputs are provided for the output device 102.

The image processing device 106 operates in synchronism with the output device 102 so as to process a data flow from the frame memory 101 to the output device 102. Thus, the image processing device 106 does not impede and slow down the printing of images stored in the frame memory 101. Also, the image processing device 106 does not carry out an image-area-identification process in the manner that an online recognition process does, i.e., creating a histogram after the processing of the entire image. Thus, the process of the image processing device 106 can be significantly faster than that of the online recognition process. Furthermore, the frame memory 101 in the present invention stores only a binary image without any auxiliary data. Thus, the present invention can be embodied at a lower cost incurred for the frame memory when compared to a method requiring identification information stored in a frame memory.

The frame memory 101 stores a binary image to be printed, and is not limited to a frame memory provided inside the printer 100 such as a laser printer. For example, it can be a page memory of a page printer, VRAM for a CRT of a computer, or a binary image file stored in an optical disk.

Figure 3:
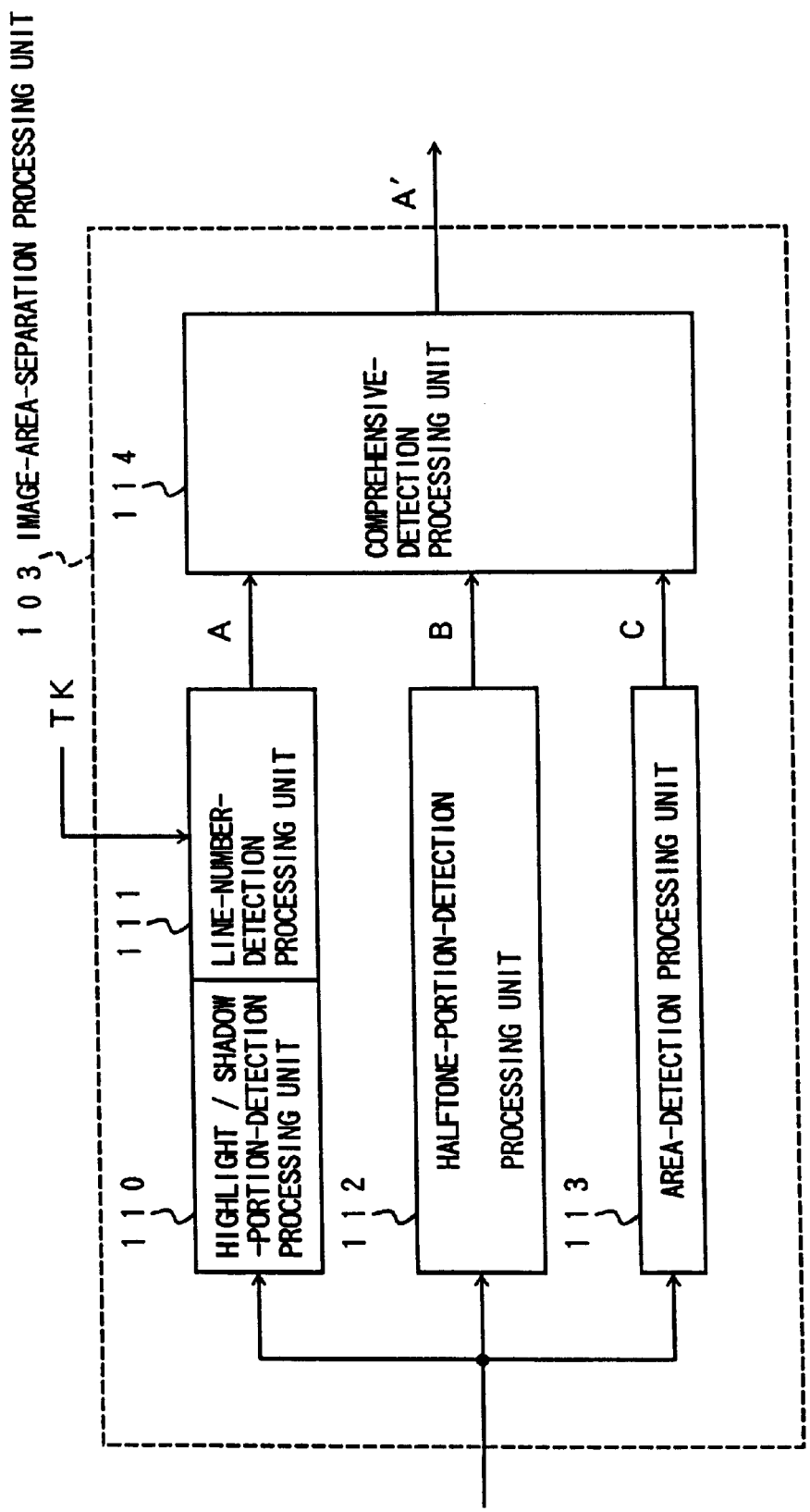
FIG. 3 is a block diagram of an image-area-separation processing unit of FIG. 2.

FIG. 3 shows a block diagram of the image-area-separation processing unit 103. In the present invention, a graphic image or a photographic image is categorized into two groups according to the number of (black) lines existing in a length of one inch. One group is a graphic or photographic image which is comprised of a small number of lines, and the other group is that which is comprised of a large number of lines. In effect, a graphic image or a photographic image comprised of a small number of lines cannot be distinguished from a screened dot pattern used for depicting letters and line-drawing. Thus, the image-area separation processing unit 103 tries to detect only a halftone image having a large number of lines (e.g, more than 100 lines per inch). However, the lower limit of this number can be changed, as will be described later.

The image-area-separation processing unit 103 includes a highlight/shadow-portion-detection processing unit 110, a line-number-detection processing unit 111, a halftone-portion-detection processing unit 112, an area-detection processing unit 113, and a comprehensive-detection processing unit 114.

The highlight/shadow-portion-detection processing unit 110 and the line-number-detection processing unit 111 operate together to tentatively extract graphic or photographic image areas comprised of a large number of lines. The halftone-portion-detection processing unit 112 detects areas comprised of letters, line drawings, and graphic images or photographic images having a small number of lines. The area-detection processing unit 113 detects areas comprised of letters, line drawings, graphic images, and photographic images. The comprehensive-detection processing unit 114 receives detection signals A, B, and C from the line-number-detection processing unit 111, the halftone-potion-detection processing unit 112, and the area-detection processing unit 113, respectively. Then, based on a comprehensive assessment of the detection signals A, B, and C, the comprehensive-detection processing unit 114 detects graphic or photographic image areas comprised of a large number of lines, and generates a detection signal A'. The processing of these processing units will be described below.

[HIGHLIGHT/SHADOW-PORTION-DETECTION PROCESSING UNIT AND LINE-NUMBER-DETECTION PROCESSING UNIT]

Under a limited circumstance that an output image is generated by a middle-resolution laser printer, there is no isolated dot around letters or line drawings. On the other hand, isolated dots can be found in graphic or photographic image areas. Accordingly, the isolated dots can be used for distinguishing graphic or photographic image areas from letters or line drawings. Also, the larger the number of lines within a given length, the more the isolated dots can be found in a given size of a graphic or photographic image area. Thus, the number of isolated dots in the given area size can be used as an indicator for distinguishing graphic or photographic image areas comprised of a large number of lines from those comprised of a small number of lines.

The highlight/shadow-portion-detection processing unit 110 detects the isolated dots so as to extract a highlight (bright) portion and a shadow (dark) portion of graphic or photographic image areas. Then, the line-number-detection processing unit 111 counts the number of the isolated dots so as to extract a shadow portion of graphic or photographic image areas, i.e., a portion comprised of a large number of lines. When graphic or photographic image areas having a large number of lines are detected, the line-number-detection processing unit 111 generates the detection signal A represented by the binary "1". The graphic or photographic image areas having a large number of lines are detected only tentatively at this stage, so that these areas may be called tentative shadow areas. The final decision is made by the comprehensive-detection processing unit 114, as will be described later.

Here, FIGS. 4A and 4B show matching patterns for detecting isolated dots. In order to detect the isolated dots, templates (matching patterns) as shown in FIGS. 4A and 4B are matched with a 3×3 area of an image.

In order to detect the graphic or photographic image areas comprised of a large number of lines, the detected isolated dots are counted within an area of a predetermined size, for example, a 9×9 pixel area. Then, the number of isolated dots Sx is compared with a threshold value Tk. If Sx is no smaller than Tk, a center pixel of the 9×9 pixel area is detected as a pixel of the graphic or photographic image areas comprised of a large number of lines.

The threshold value Tk is dynamically changed while the 9×9 pixel area is moved over the image. The threshold value Tk is initially set to 5, for example, and can be changed according to conditions set forth in FIG. 4C. In doing so, the criterion to detect the graphic or photographic image areas can be changed dynamically.

The dynamic changes in the threshold value Tk as shown in FIG. 4C can increase the probability of detecting an image area of one sort around an image area of the same sort. For example, the threshold value Tk is lowered at a given position when Sx is greater than the threshold value Tk by more than one, i.e., when a pixel at that position is definitely a pixel of a graphic or photographic image area having a large number of lines. Because the threshold value Tk is lowered, a pixel at the next position is more likely to be detected as the graphic or photographic image areas having a large number of lines. Likewise, the threshold value Tk is raised at a given position when a pixel at that position is not a pixel of a graphic or photographic image area having a large number of lines. Thus, a pixel at the next position is more likely to be detected as a continuation of the area of the same type. Here, the threshold value Tk may be set externally instead, depending on a quality of an original image or on the purpose of printing.

Figure 5:
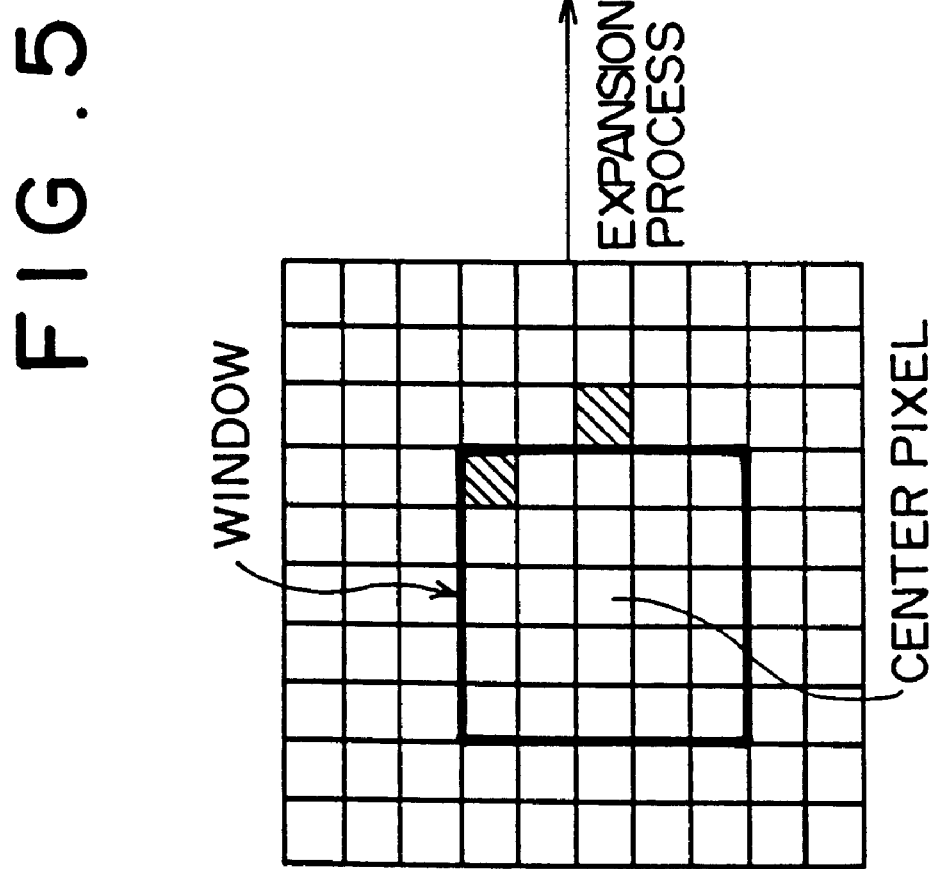
FIG. 5 is an illustrative drawing showing an expansion process for expanding detected dots.

Pixels detected as a graphic or photographic image area having a large number of lines are subject to an expansion process using a window of a predetermined size. This expansion process is shown in FIG. 5, where the window has a size of 5×5 pixels as an example. As shown in FIG. 5, the window is moved over an image comprised of detected pixels (shown as black pixels) and pixels which are not detected (shown as white pixels). When there is at least one detected pixel within the window, the center pixel of the window is also regarded as a detected pixel. Thus, as shown in FIG. 5, detected pixels which are located close to each other end up being grouped with a large chunk of detected pixels.

The dynamic changes in the threshold value Tk and the expansion process described above ensures that the detected pixels tend to be clustered rather than isolated from each other. Thus, the detection of image areas can be prevented from becoming too sensitive to a small fluctuation of the number of lines.

Images stored in an optical disk or images sent via a facsimile can have isolated dots around letters or line drawings, because multi-valued images scanned by the scanner 600 are converted into binary images. However, the isolated dots around letters or line drawings are fewer than those of graphic or photographic image areas. Thus, in the present invention, even when the isolated dots exist around letters or line-drawings, they are not detected as pixels of graphic or photographic image areas.

In such a system as an optical-file system which holds images scanned by a scanner of known characteristics, isolated dots around letters and line-drawings can be removed by a background removal process.

[HALFTONE-PORTION-DETECTION PROCESSING UNIT]

In photographic images, there are chunks or groups of white pixels or black pixels, and sizes of these chunks decrease as the number of lines increases. Thus, halftone photographic image areas having a small number of lines can be detected by finding chunks or groups of pixels of an appropriate size.

FIGS. 6A through 6L show examples of matching patterns for finding chunks of black pixels or white pixels. By matching these matching patterns with the input binary image, the chunks which have the same arrangement as those of the matching patterns can be detected. Then, each detected pixel is subject to the expansion process described earlier.

This results in a detection of halftone areas of the input binary image, which include letters, line drawings, and graphic or photographic image areas of a small number of lines. When the letters, the line drawings, and the graphic or photographic image areas are detected, the halftone-portion-detection processing unit 112 generates the detection signal B represented by the binary "1".

[AREA-DETECTION PROCESSING UNIT]

The area-detection processing unit 113 detects areas which are comprised of either letters, line-drawings, graphics, or photographic images. In other words, the area-detection processing unit 113 excludes background areas, which are defined as any blank area, so as to detect non-background areas.

Detection of the areas is realized by the expansion process described with reference to FIG. 5. In this case, however, an image input to the area-detection processing unit 113 is not the image of detected pixels, but is the binary image provided for the image processing unit 106. Thus, the expansion process at the area-detection processing unit 113 is meant to expand black pixels to generate large chunks of black pixels covering the areas other than the background.

When the areas are detected, a detection signal C represented by the binary "1" is generated.

[COMPREHENSIVE-DETECTION PROCESSING UNIT]

The comprehensive-detection processing unit 114 detects the shadow areas, i.e., graphic or photographic image areas comprised of a large number of lines, based on the detection signals A, B, and C. A comprehensive assessment of the detection signals A, B, and C can enhance the reliability of the detection of graphic or photographic image areas having a large number of lines.

As noted above, if the detection signal A is "1", the pertinent pixel belongs to the tentative shadow areas, i.e., areas which are likely to be the shadow areas. If the detection signal B is "1", the pertinent pixel belongs to the halftone areas, i.e., areas which include letters, line-drawings, and highlight graphic or highlight photographic image areas. The halftone areas are supposed to be areas other than the shadow area and the background area. If the detection signal C is "1", the pertinent pixel belongs to the non-background areas, i.e., areas which include letters, line-drawings, and graphic or photographic image areas.

If detections of these areas were accurate, the tentative shadow areas would coincide with the shadow areas, and the non-background areas minus the halftone areas would also coincide with the shadow areas. However, since the detections are not accurate, a comprehensive judgment should be made based on these detection signals A, B, and C.

In order to make the comprehensive judgment, the comprehensive-detection processing unit 114 detects a pixel for which C is equal to 1 and either A is equal to 1 or B is equal to 0. Then, the comprehensive-detection processing unit 114 generates the detection signal A' as a binary "1" for the detected pixel. The detection signal A' of "1" indicates that this pixel belongs to a graphic or photographic image area having a large number of lines.

This comprehensive detection process is found to be more effective when an image having no lines is created by an error diffusion process than when a binary image is created by a dither process or a halftone screen process. Thus, in closed systems which use an image scanner of known characteristics, a binary image is preferably created by the error diffusion process which preserves densities of an image scanned by the scanner. FIG. 7 shows such a configuration, in which the scanner 600 scans an image, and the scanned image is converted into a binary image by an error-diffusion processing unit 120. The binary image is then subject to the processing of the image processing unit 106.

In general, halftone-screen processing is used for converting an image into a binary image in a printer 100 such as a laser printer. In the present invention, however, the error-diffusion processing which preserves densities is used in light of the fact described above.

The outline-correction processing unit 104, the multi-value processing unit 105, and the selection unit 107 of FIG. 2 will now be described below.

[OUTLINE-CORRECTION PROCESSING UNIT]

The outline-correction processing carried out by the outline-correction processing unit 104 is similar to the RET method of the Hewlett-Packard Co. In detail, a 7×11 pixel template is used in template matching for detecting jagged edges of letters and line drawings. Then, binary pixels around the detected jagged edges are converted and printed in multi-values, so that the printed edges visually appear to be less jagged. Generally, this process has a harmful effect on photographic or graphic images. However, according to the present invention, the outline-correction processing is applied to photographic or graphic images comprised of a small number of lines as well as letters and line drawings. Thus, no harmful effect is inflicted.

[MULTI-VALUE PROCESSING UNIT]

Figures 8, 9, 10:
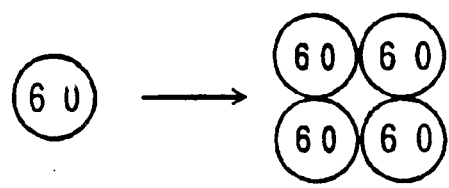
FIG. 8 is an illustrative drawing showing a Laplacian filter used in a multi-value processing unit of FIG. 2.
FIG. 9 is an illustrative drawing showing an averaging filter used in a multi-value processing unit of FIG. 2.
FIG. 10 is an illustrative drawing showing an enlargement process enlarging an image by a factor of 2.

The multi-value processing unit 105 first applies a Laplacian filter shown in FIG. 8 to a binary image. As is well known, an output image of the Laplacian filter has a large pixel value around edge portions of the input image, and has small pixel values in portions of gradual level changes.

Then, the multi-value processing unit 105 applies an averaging filter shown in FIG. 9 to the binary image to generate a multi-valued image. Since sharpness of the edges should be preserved as much as possible, the averaging filter should have a small size around the edges. In consideration of this, the multi-value processing unit 105 changes a size of the averaging filter according to the magnitude of the Laplacian filter output. That is, when the averaging filter is applied in order to generate the multi-valued image, the size of the averaging filter is decreased as the magnitude of the Laplacian filter output increases. This process of generating the multi-valued image is referred to as the pseudo-multi-value processing, and the multi-valued image thus generated is referred to as a pseudo-multi-valued image.

Then, the multi-value processing unit 105 applies a multi-value gray-scale process such as a 2×2 multi-value dither process. Here, the output device 102 of FIG. 2 is assumed to be capable of outputting a multi-valued image, and a 2×2 matrix of multi-valued pixels is assumed to be a unit for representing a gray scale. Thus, the pseudo-multi-valued image created by the pseudo-multi-value processing is subject to the 2×2 multi-value dither process. The 2×2 multi-value dither process assigns possible output levels of the output device to each pixel, such that the 2×2 matrix has a gray level approximately representing a value of a corresponding portion of the pseudo-multi-valued image.

When an output device is capable of printing only binary images, the multi-value gray-scale process can be a binary halftone process using finer lines or an error-diffusion process, instead of the multi-value dither process. When a printer is capable of precisely representing as many as 256 gray levels as in the case of sublimation-type thermal printers, the multi-value gray-scale process can be omitted.

Images received via a facsimile are typically represented at 200 DPI. Thus, if the printer 100 of FIG. 2 operates at 400 DPI, a width and a length of the images should be enlarged by a factor of 2. Also, jagged edges of letters and line drawings in facsimile images are generally removed by a smoothing process. However, when the SPC method, the logical sum method, and the projection method are applied to facsimile images, photographic or graphic images tend to become coarse pictures having a degraded image quality.

The multi-value processing unit 105 enlarges the size of pseudo-multi-valued photographic images by a factor of 2. This is done by applying a simple enlargement method of enlarging 1 pixel into 2×2 pixels of the same values, as shown in FIG. 10. This can improve the image quality of photographic images and the like.

[SELECTION UNIT]

The selection unit 107 receives the detection signal A' from the image-area-separation processing unit 103. When the detection signal A' is equal to 1, the current pixel is a pixel of a graphic or photographic image area having a large number of lines. Thus, the selection unit 107 selects the output of multi-value processing unit 105. On the other hand, when the detection signal A' is equal to 0, the current pixel is not a pixel of a graphic or photographic image area having a large number of lines. Thus, the selection unit 107 selects the output of the outline-correction processing unit 104.

In this manner, the printer provided with the image processing unit 106 can print out the multi-valued image of an improved image quality while eliminating the jagged edges of letters and line drawings.

Figure 11:
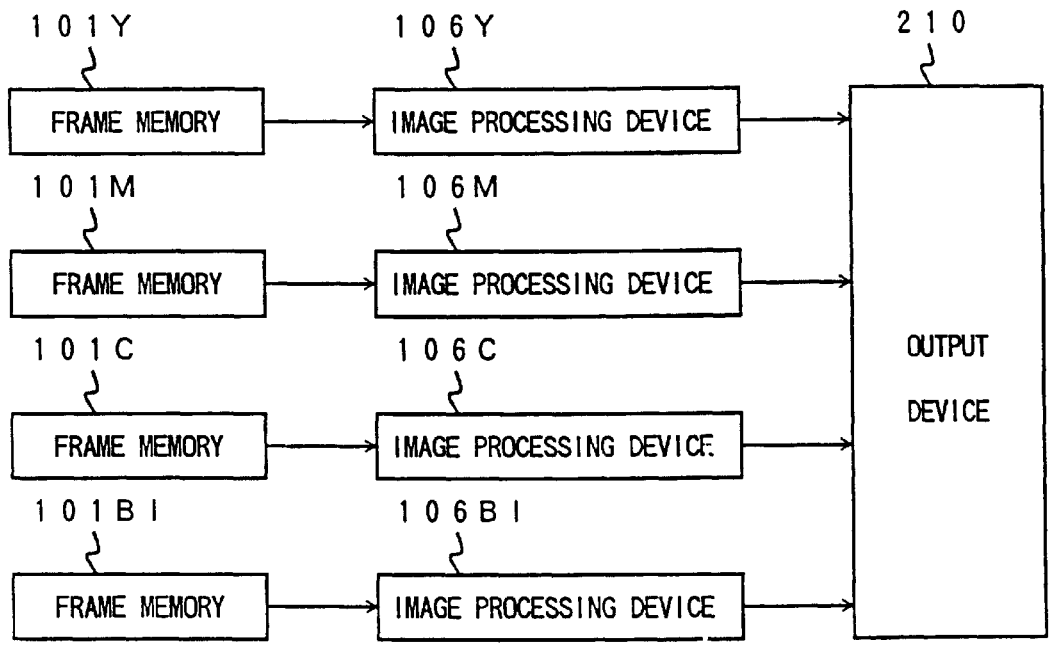
FIG. 11 is a block diagram of a variation of a printer having the image processing devices of FIG. 2.

FIG. 11 shows a variation of the printer having the image processing devices of the present invention. In the previous example, the image processing device of the present invention is applied to binary black-and-white images. In this variation, each color component is treated as a binary color image. Namely, four colors of yellow, magenta, cyan, and black are used in color printing. Binary data for these colors is stored in frame memories 101Y, 101M, 101C, and 101B, respectively. Image processing units 106Y, 106M, 106C, and 106B carry out the binary-to-multi-value processing in the same way as that of the previous embodiment. Then, outputs of the image processing units 106Y, 106M, 106C, and 106B are provided for the color output device 210.

Figure 12A:
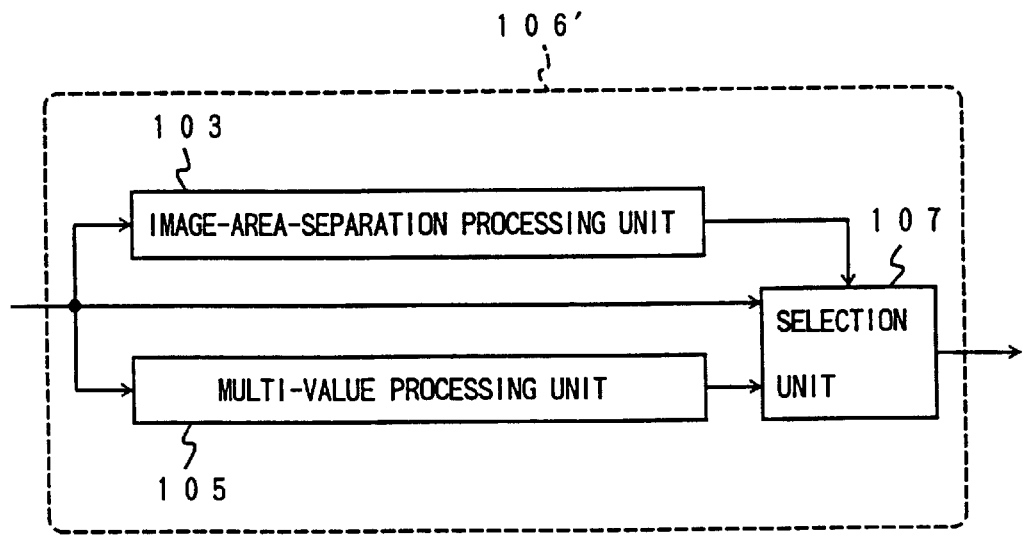
FIGS. 12A and 12B are block diagrams of a variation of the image processing device of FIG. 2 and another variation of a printer, respectively.
Figure 12B:
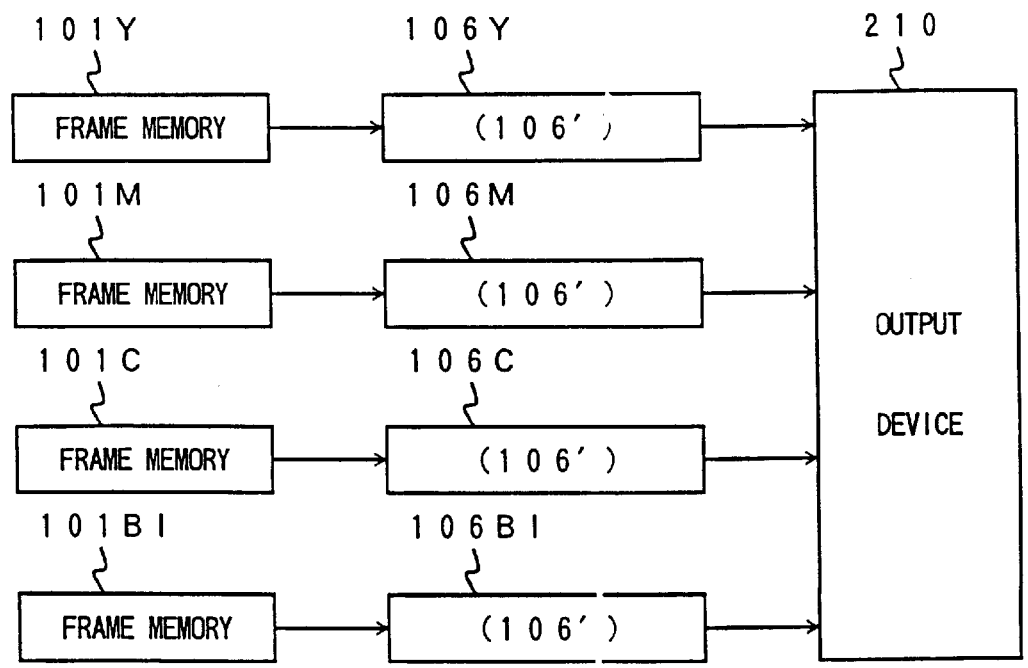

Even in a color document, letters and line drawings tend to be in black and white. Thus, as shown in FIGS. 12A and 12B, an image processing device 106' which does not include the outline-correction processing unit may be used as the image processing devices 106Y, 106M, and 106C. The image processing device 106 of FIG. 2 may be used as the image processing unit 106B to perform the outline-processing only on black pixels. In this case, jagged edges of color letters and color line drawings cannot be eliminated. However, this configuration of the image processing device can be implemented at a lower cost.

As described above, according to the present invention, the photographic or graphic images comprised of a relatively large number of lines are made into multi-valued images by using filters, so that the photographic or graphic images comprised of the relatively large number of lines can be represented in gray levels. Also, only image areas other than the photographic or graphic image areas having the relatively large number of lines are subject to the outline-correction processing for correcting the jagged edges. Thus, the outline-correction processing can be prevented from having a harmful effect on the photographic or graphic image areas having a relatively large number of lines.

Also, according to the present invention, the multi-value processing and the outline-correction processing are performed in realtime on data flow between the memory storage for a binary image and the multi-value output device. Thus, a binary image can be converted into a multi-valued image without slowing printing speed.

Furthermore, according to the present invention, the photographic or graphic image areas comprised of a relatively small number of lines, as well as letters and line drawings, are subject to the outline-correction processing. Thus, an image quality of the photographic or graphic image areas comprised of a relatively small number of lines can be prevented from degrading.

Also, according to the present invention, the threshold value which is used for detecting high-shadow portions of the photographic or graphic images can be set externally. Thus, when noise is contained in such images as the facsimile images or the optical-file images scanned by the scanner, the threshold value can be set to a larger value in order to prevent erroneous image-area separation.

Furthermore, according to the present invention, images which are made into multi-valued images are enlarged by a given factor. Thus, the SPC method, the logical sum method, the projection method, and the like can be prevented from degrading an image quality in the photographic or graphic image areas.

Also, according to the present invention, images having multi-values are converted into binary images by using the error diffusion process which preserves image densities. Thus, the gray-level representation of the reconstructed multi-valued images can be enhanced.

Furthermore, according to the present invention, the image processing device of the present invention can be provided for each color component in a color printer. Thus, jagged edges of letters and line drawings in color images can be removed, and, at the same time, the gray-scale representation of the photographic or graphic image areas can be enhanced.

Also, according to the present invention, the outline-correction processing can be conducted only for the black component among various color components. Thus, jagged edges of letters and line drawings can be removed with a low cost incurred on the implementation of the image processing device.

Further, the present invention is not limited to these embodiments, but various variations and modifications may be made without departing from the scope of the present invention.

What is claimed is:

1. An image processing device converting a binary image into a multi-valued output image, said image processing device comprising:
    an image-area-separation processing unit which detects shadow areas in said binary image, wherein said shadow areas are at least one of graphic and photographic image areas defined by a number of lines which is greater than a predetermined number of said lines;
    an outline-correction processing unit which corrects jagged edges in said binary image to generate corrected image binary image data;
    a multi-value processing unit converting said binary image into a multi-valued image by a filter application; and
    a selection unit which selects said multi-valued image for said shadow areas and said corrected image binary image data for areas other than said shadow areas so as to generate said multi-valued output image.

2. The image processing device as claimed in claim 1, wherein said areas other than said shadow areas include letter areas, line-drawing areas, graphic image areas defined by a number of lines which is less than said predetermined number of said lines, and photographic image areas defined by a number of lines which is less than said predetermined number of said lines.

3. The image processing device as claimed in claim 1, wherein said image-area-separation processing unit comprises:
    a shadow-area detecting unit detecting tentative shadow areas which substantially coincide to said shadow areas;
    a halftone-area detecting unit which detects halftone areas, said halftone areas including letter areas, line-drawings areas, at least one of graphic and photographic image areas defined by a number of lines which is less than said predetermined number of said lines, and at least one of graphic and photographic image areas defined by a number of lines equal to said predetermined number of said lines;
    an area-detecting unit which detects non-background areas, said non-background areas including said letter areas, line-drawing areas, graphic image areas, and photographic image areas; and
    a comprehensive-detecting unit detecting said shadow areas by selecting said non-background areas which belong to at least one of said tentative shadow areas and areas other than said halftone areas.

4. The image processing device as claimed in claim 3, wherein said shadow-area detecting unit comprises:
    a highlight/shadow-portion detecting unit which detects isolated dots in said binary image so as to detect said at least one of said graphic and photographic image areas; and
    a line-number detecting unit which detects said tentative shadow areas by finding a pixel with a surrounding area of a predetermined size which includes a number of isolated dots, said number being greater than a threshold value.

5. The image processing device as claimed in claim 4, wherein said threshold value is changed dynamically depending on a position of said pixel in said binary image, so that said tentative shadow areas tend to be clustered.

6. The image processing device as claimed in claim 4, wherein said threshold value is set externally.

7. The image processing device as claimed in claim 3, wherein said halftone-area detecting unit detects said halftone areas by finding chunks of at least one of black pixels and white pixels, which chunks have a size larger than a predetermined chunk size.

8. The image processing device as claimed in claim 3, wherein said area-detecting unit detects said non-background areas by expanding black pixels of said binary image within a window of a predetermined window size.

9. The image processing device as claimed in claim 1, wherein said multi-value processing unit further enlarges said multi-valued image by a predetermined factor.

10. The image processing device as claimed in claim 3, wherein said binary image is an image created by an error-diffusion technique from an original multi-valued image.

11. The image processing device as claimed in claim 1, wherein said areas other than said shadow areas include letter areas, line-drawing areas, graphic image areas defined by a number of lines equal to said predetermined number of said lines, and photographic image areas defined by a number of lines equal to said predetermined number of said lines.

12. An image processing device for a color image formed from color binary images each in a corresponding color component, said image processing device comprising:

image-area-separation processing units, each of which detects shadow areas in a corresponding color binary image, wherein said shadow areas are at least one of graphic and photographic image areas comprised of a number of lines which is greater than a predetermined number of said lines;

outline-correction processing units, each of which corrects jagged edges in a corresponding color binary image to generate corrected image binary image data;

multi-value processing units, each of which converts a corresponding color binary image into a multi-valued image by a filter application; and selection units, each of which selects said multi-valued image for said shadow areas and said corrected image binary image data for areas other than said shadow areas so as to generate an output image of a corresponding color component.

13. The image processing device as claimed in claim 12, wherein said outline-correction processing unit is provided only for a black color component.

14. An image output device comprising:

a memory storing a binary image;

an image-area-separation processing unit detecting shadow areas in said binary image, wherein said shadow areas are at least one of graphic and photographic image areas comprised of a number of lines which is greater than a predetermined number of said lines;

an outline-correction processing unit correcting jagged edges in said binary image to generate corrected image binary image data;

a multi-value processing unit converting said binary image into a multi-valued image by a filter application;

a selection unit selecting said multi-valued image for said shadow areas and said corrected image binary image data for areas other than said shadow areas so as to generate an output image; and an output device printing said output image.

15. The image output device as claimed in claim 14, wherein said image-area-separation processing unit, said outline-correction processing unit, said multi-value processing unit, and said selection unit operate in synchronism with said output device.

16. The image output device as claimed in claim 14, wherein said areas other than said shadow areas include letter areas, line-drawing areas, graphic image areas defined by a number of lines which is less than said predetermined number of said lines, and photographic image areas defined by a number of lines which is less than said predetermined number of said lines.

17. The image output device as claimed in claim 14, wherein said image-area-separation processing unit comprises:

a shadow-area detecting unit detecting tentative shadow areas which substantially coincide to said shadow areas;

a halftone-area detecting unit which detects halftone areas, said halftone areas including letter areas, line-drawing areas, at least one of graphic and photographic image areas defined by a number of lines which is less than said predetermined number of said lines, and at least one of graphic and photographic image areas defined by a number of lines equal to said predetermined number of said lines;

an area-detecting unit which detects non-background areas, said non-background areas including said letter areas, said line-drawing areas, graphic image areas, and photographic image areas; and a comprehensive-detecting unit detecting said shadow areas by selecting said non-background areas which belong to at least one of said tentative shadow areas and areas other than said halftone areas.

18. The image output device as claimed in claim 17, wherein said shadow-area detecting unit comprises:

a highlight/shadow-portion detecting unit which detects isolated dots in said binary image so as to detect said at least one of said graphic and photographic image areas; and a line-number detecting unit which detects said tentative shadow areas by finding a pixel with a surrounding area of a predetermined size which includes a number of isolated dots, said number being greater than a threshold value.

19. The image output device as claimed in claim 18, wherein said threshold value is changed dynamically depending on a position of said pixel in said binary image, so that said tentative shadow areas tend to be clustered.

20. The image output device as claimed in claim 18, wherein said threshold value is set externally.

21. The image output device as claimed in claim 17, wherein said halftone-area detecting unit detects said halftone areas by finding chunks of at least one of black pixels and white pixels, which chunks have a size larger than a predetermined chunk size.

22. The image output device as claimed in claim 17, wherein said area-detecting unit detects said non-background areas by expanding black pixels of said binary image within a window of a predetermined window size.

23. The image output device as claimed in claim 17, wherein said binary image is an image which is created by an error-diffusion technique from an original multi-valued image.

24. The image output device as claimed in claim 14, wherein said multi-value processing unit further enlarges said multi-valued image by a predetermined factor.

25. The image output device as claimed in claim 14, wherein said areas other than said shadow areas include letter areas, line-drawing areas, graphic image areas defined by a number of lines equal to said predetermined number of said lines, and photographic image areas defined by a number of lines equal to said predetermined number of said lines.

26. An image output device comprising:

a memory storing color binary images forming a color image, each of said color binary images having a corresponding color component;

image-area-separation processing units, each of which detects shadow areas in a corresponding color binary image, wherein said shadow areas are at least one of graphic and photographic image areas comprised of a number of lines which is greater than a predetermined number of said lines;

outline-correction processing units, each of which corrects jagged edges in a corresponding color binary image to generate corrected image binary image data;

multi-value processing units, each of which converts a corresponding color binary image into a multi-valued image by a filter application;

selection units, each of which selects said multi-valued image for said shadow areas and selects said correction image binary image for areas other than said shadow areas so as to generate an output image of a corresponding color component; and an output device printing a multi-valued color image by using output images, each of which is said output image of said corresponding color component.

27. The image processing device as claimed in claim 26, wherein said outline-correction processing unit is provided only for a black color component.

28. An image processing device converting a binary image into a multi-valued output image, said image processing device comprising:

an image-area-separation processing unit which detects shadow areas in said binary image, wherein said shadow areas are at least one of graphic and photographic image areas defined by a number of lines which is greater than a predetermined number of said lines;

an outline-correction processing unit which corrects jagged edges in said binary image to generate corrected image binary image data;

a multi-value processing unit converting said binary image into a multi-valued image by a filter application;

a selection unit which selects said multi-valued image for said shadow areas and said corrected image binary image data for areas other than said shadow areas so as to generate said multi-valued output image; and an output device for receiving an output of the selection unit.

* * * * *